United States Patent
Van der Goes et al.

(10) Patent No.: US 9,614,662 B2
(45) Date of Patent: Apr. 4, 2017

(54) MULTI-INPUT WIRELESS RECEIVER BASED ON RF SAMPLING TECHNIQUES

(71) Applicant: Broadcom Corporation, Irvine, CA (US)

(72) Inventors: Frank Van der Goes, Zeist (NL); Jiangfeng Wu, Irvine, CA (US); David Garrett, Tustin, CA (US)

(73) Assignee: BROADCOM CORPORATION, Irvine, CA (US)

(*) Notice: Subject to any disclaimer, the term of this patent is extended or adjusted under 35 U.S.C. 154(b) by 17 days.

(21) Appl. No.: 14/692,361

(22) Filed: Apr. 21, 2015

(65) Prior Publication Data
US 2016/0285617 A1 Sep. 29, 2016

Related U.S. Application Data

(60) Provisional application No. 62/136,991, filed on Mar. 23, 2015.

(51) Int. Cl.
*H03K 9/00* (2006.01)
*H04L 7/033* (2006.01)
*H04B 1/16* (2006.01)
*H04L 7/00* (2006.01)
*H04L 7/02* (2006.01)

(52) U.S. Cl.
CPC .......... *H04L 7/0331* (2013.01); *H04B 1/16* (2013.01); *H04L 7/0008* (2013.01); *H04L 7/02* (2013.01); *H04L 7/0334* (2013.01); *H04L 7/0337* (2013.01)

(58) Field of Classification Search
CPC ....... H04L 7/0008; H04L 7/02; H04L 7/0337; H04L 7/0334; H04L 7/0331; H04B 1/16
USPC .................................................. 375/354–355
See application file for complete search history.

(56) References Cited

U.S. PATENT DOCUMENTS

| | | | | |
|---|---|---|---|---|
| 2006/0045126 | A1* | 3/2006 | Klahn | H04B 1/28 370/465 |
| 2006/0153319 | A1* | 7/2006 | Gorsuch | H04B 7/08 375/347 |
| 2007/0066254 | A1* | 3/2007 | Tsuchie | H04B 1/0014 455/183.2 |
| 2012/0147943 | A1* | 6/2012 | Goodman | H04L 27/01 375/232 |

* cited by examiner

*Primary Examiner* — Janice Tieu
(74) *Attorney, Agent, or Firm* — Foley & Lardner LLP; Christopher J. McKenna; Paul M. H. Pua

(57) ABSTRACT

In some aspects, the disclosure is directed to methods and systems of a multi-input receiver. In one or more embodiments, a receiver receives a plurality of signals each via a respective one of a plurality of wireless channels. In one or more embodiments, a processing stage of the receiver combines the received plurality of signals into a combined signal for input to an analog-to-digital converter (ADC) of the receiver. In one or more embodiments, the ADC generates, at a predetermined sampling frequency, samples of the combined signal. In one or more embodiments, the receiver recovers from the generated samples at least one signal component corresponding to at least one of the plurality of signals.

20 Claims, 9 Drawing Sheets

MULTI-INPUT WIRELESS RECEIVER BASED ON RF SAMPLING TECHNIQUES

RELATED APPLICATIONS

This application claims priority to and the benefit of U.S. Provisional Patent Application No. 62/136,991, filed Mar. 23, 2015. The entire contents of the foregoing are hereby incorporated herein by reference for all purposes.

FIELD OF THE DISCLOSURE

This disclosure generally relates to systems and methods of a wireless receiver, including but not limited to systems and methods of a wireless receiver based on radio frequency (RF) sampling techniques.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and RF circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA). As increased data throughput and other developments occur, new techniques and new standards are constantly being developed for adoption.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following standard(s) and specification(s), including any draft versions of such standard(s) and specification(s), are hereby incorporated herein by reference in their entirety and are made part of the present disclosure for all purposes: Long-Term Evolution (LTE); LTE-Advanced (LTE-A); and 3GPP. Although this disclosure can reference aspects of these standard(s) and specification(s), the disclosure is in no way limited to these aspects.

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods of a multi-input receiver based on RF sampling techniques.

A. Computing and Network Environment

Figure 1A:
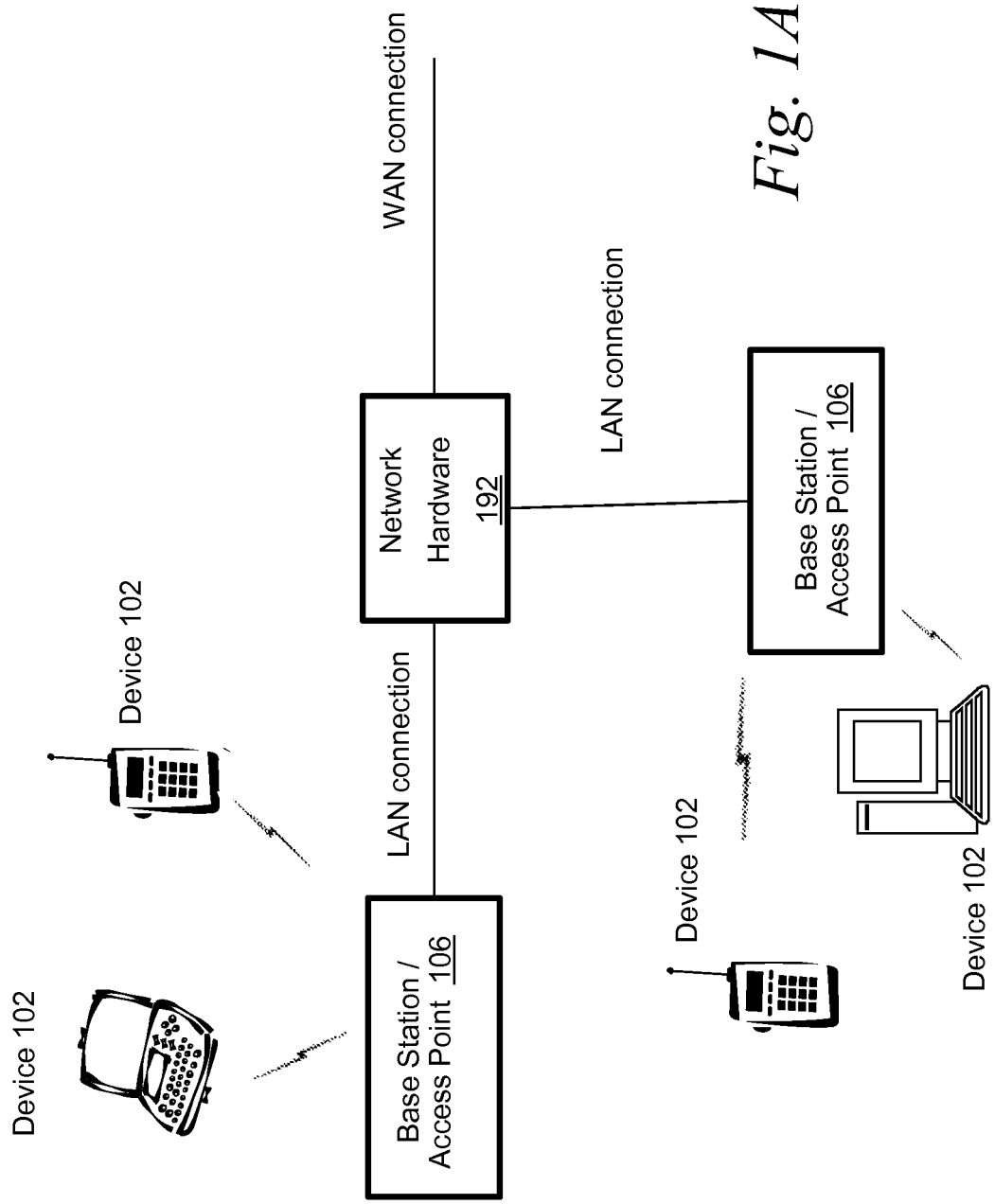
FIG. 1A is a block diagram depicting an embodiment of a network environment including one or more wireless communication devices in communication with one or more devices or stations.

Prior to discussing specific embodiments of the present solution, it might be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more base stations 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or base station are described in greater detail with reference to FIGS. 1B and 1C. The network environment can be an ad hoc network environment, an infrastructure wireless network environment, a subnet environment, etc., in one embodiment.

Terms such as "wireless communication device", "user equipment," "mobile station," "mobile," "mobile device," "subscriber station," "subscriber equipment," "access terminal," "terminal," "handset," and similar terminology, can refer to a wireless device utilized by a subscriber or user of a wireless communication service to receive or convey data, control, voice, video, sound, gaming, or substantially any data-stream or signaling-stream. The foregoing terms can be utilized interchangeably in the present disclosure. Likewise, terms such as "access point (AP)," "wireless access point (WAP)," "base station," "base transceiver station", "Node B," "evolved Node B (eNode B or eNB)," home Node B (HNB)," "home access point (HAP)," and similar terminology, can be utilized interchangeably in the present disclosure, and refer to a wireless network component or apparatus that serves and receives data, control, voice, video, sound, gaming, or substantially any data-stream or signaling-stream from a set of wireless devices.

Referring again to FIG. 1A, the base stations 106 can be operably coupled to the network hardware 192 via local area network connections. The network hardware 192, which can include a router, gateway, switch, bridge, modem, system controller, appliance, etc., can provide a local area network connection for the communication system. Each of the base stations 106 can have an associated antenna or an antenna array to communicate with the wireless communication devices 102 in its area. The wireless communication devices 102 can register with a particular access point 106 to receive services from the communication system (e.g., via a single user (SU) multiple input and multiple output (MIMO) or multiple user (MU) MIMO configuration). For direct connections (e.g., point-to-point communications), some wireless communication devices 102 can communicate directly via an allocated channel and communications protocol. Some of the wireless communication devices 102 can be mobile or relatively static with respect to the access point 106.

In some embodiments, a base station 106 includes a device or module (including a combination of hardware and software) that allows wireless communication devices 102 to connect to a wired network using LTE, Wi-Fi, and/or other standards. A base station 106 can be implemented, designed and/or built for operating in a wireless local area network (WLAN), such as in a cellular network. A base station 106 can connect to a router (e.g., via a wired network) as a standalone device in some embodiments. In other embodiments, a base station can be a component of a router. A base station 106 can provide multiple devices 102 access to a network.

A base station 106 can, for example, connect to a wired Ethernet connection and provide wireless connections using radio frequency links for other devices 102 to utilize that wired connection. A base station 106 can be built and/or implemented to support a standard for sending and receiving data using one or more radio frequencies. Those standards, and the frequencies they use can be defined by the IEEE or 3GPP for example. A base station 106 can be implemented and/or used to support cellular coverage, public Internet hotspots, and/or on an internal network to extend the network's signal (e.g., Wi-Fi) range.

In some embodiments, the base stations 106 can be used for (e.g., in-home or in-building) wireless networks (e.g., IEEE 802.11, Bluetooth, ZigBee, cellular, any other type of radio frequency based network protocol and/or variations thereof). Each of the wireless communication devices 102 can include a built-in radio and/or is coupled to a radio. Such wireless communication devices 102 and/or base stations 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more base stations 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
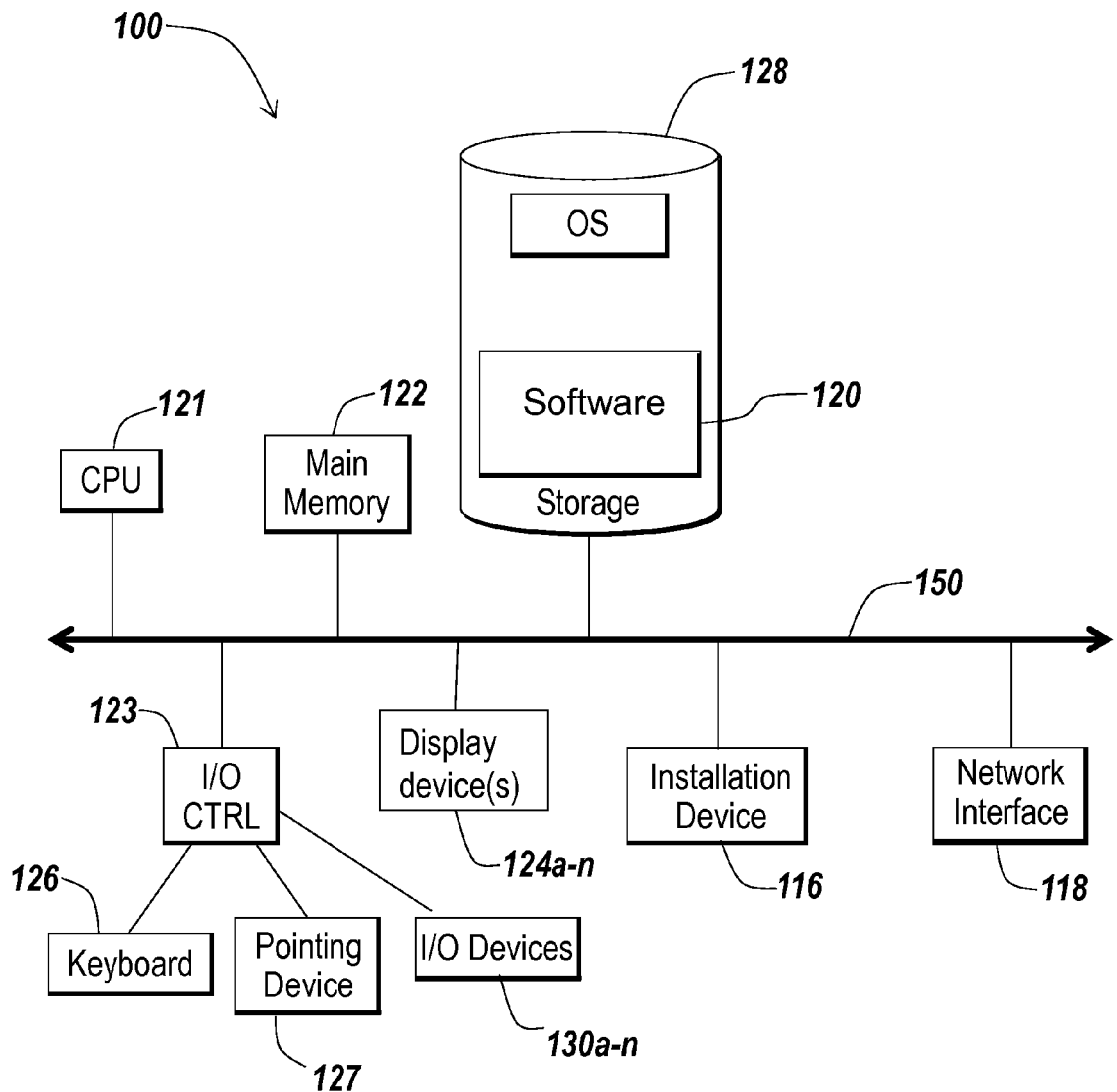
FIGS. 1B and 1C are block diagrams depicting embodiments of computing devices useful in connection with the methods and systems described herein.
Figure 1C:
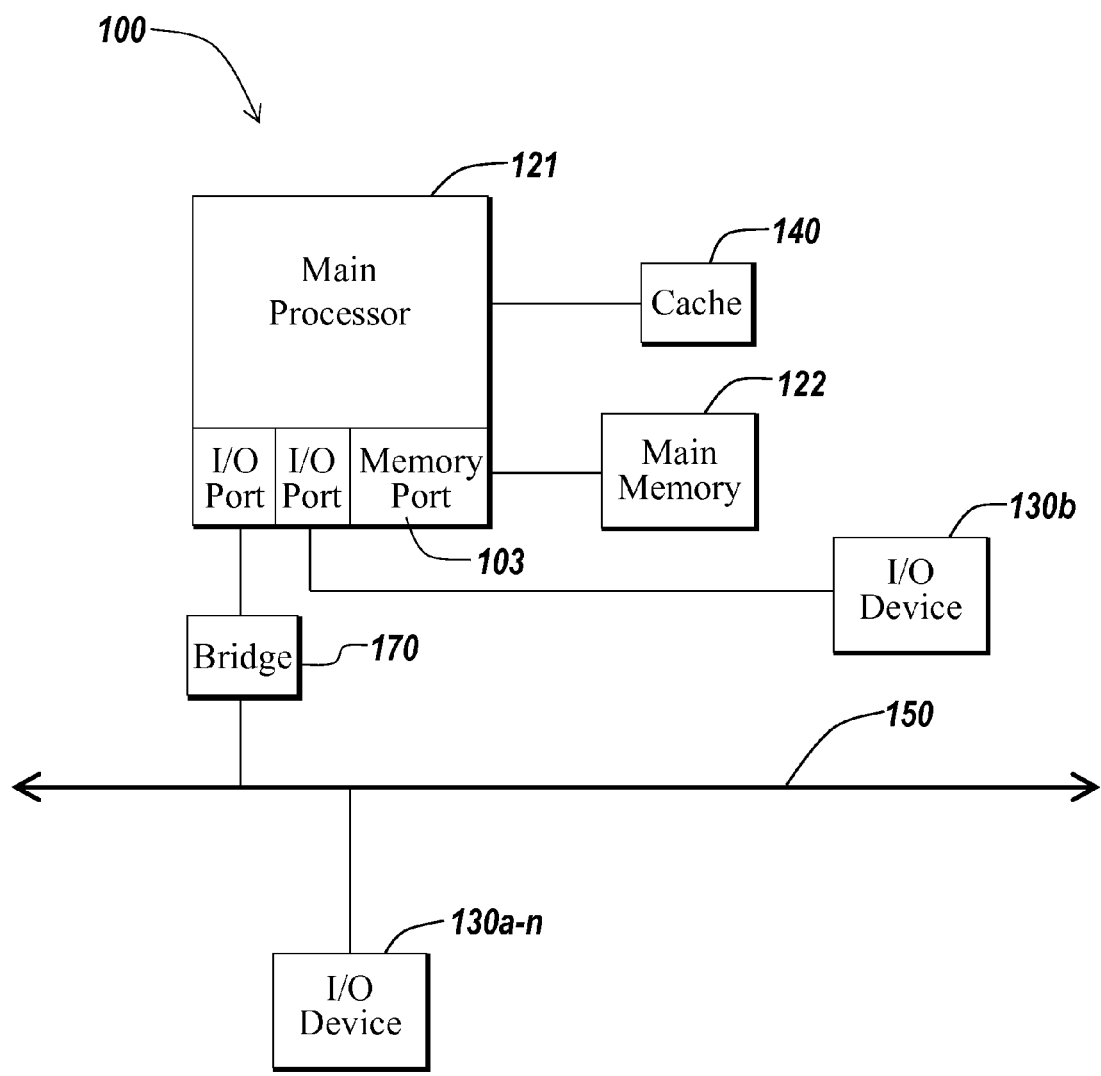

The communications device(s) 102 and base station(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the base station 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; those manufactured by ARM Holdings, plc of Cambridge, England. or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax, LTE, LTE-A and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be implemented for using multiple displays 124a-124n. One ordinarily skilled in the art will recognize and appreciate the various ways and embodiments that a computing device 100 can be implemented to have one or more display devices 124a-124n.

In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Multi-Input Receiver Based on RF Sampling Techniques

Described herein are systems and methods for a multi-input receiver based on RF sampling techniques. In some implementations, a receiver receives signals over a plurality of channels at multiple frequency bands or within the same band. In one or more embodiments, the receiver includes separate receiver chains for processing signals in each channel. Using RF sampling techniques, a multi-band and/or MIMO receiver uses one single ADC for sampling received signals while receiving the signals over multiple channels in one or more embodiments. In one or more embodiments, it is possible for the receiver to benefit from lower cost, device area and/or power, and yet provide appropriate spectral coverage within a suitable dynamic range for all of the input signals or channels.

In one aspect, a direct sampling receiver has N signal inputs, N samplers and/or one ADC in one or more embodiments. Each of the N signals are independently filtered, amplified, and sampled in one or more embodiments. In one or more embodiments, each of the N samplers samples a corresponding signal at Fclk/N, and the sampling is time/phase-shifted or time-interleaved between the N samplers. The samples are interleaved (e.g., in time) and then sampled by the ADC before being demultiplexed or de-interleaved to recover N signal components, in one or more embodiments. The ADC digitizes the interleaved samples or signals at Fclk.

In another aspect, a direct sampling receiver has N inputs, N or N−1 mixers, a combiner and/or one ADC in one or more embodiments. In one or more embodiments, N (or N−1, or less) mixers operate at mixer frequencies that do not have to be the same. Some of the mixer frequencies could be different, others can be the same, in one or more embodiments. For example and in one or more embodiments, the N inputs receive signals (e.g., MIMO signals) from N antennas at the same frequency. In another example, the receiver receives signals from N different frequency bands, in one or more embodiments.

In yet another aspect, a receiver combines inputs from different frequency bands such that Noise Figures of the corresponding channels/bands are not degraded, in one or more embodiments. The receiver then samples the combined inputs with one ADC, in one or more embodiments. In one or more embodiments, a receiver employs a combination of the above-described elements, e.g., a receiver with N inputs, M1 samplers, M2 mixers, a combiner and/or one ADC. In one or more embodiments, one phase lock loop (PLL) is used to support multiple bands and/or multiple channels in the receiver.

Therefore, in one or more embodiments, a multi-input receiver is implemented to receive a plurality of signals, each via a respective channel, and instead of using separate receive chains with its own ADC and/or PLL to process the received plurality of signals. In one or more embodiments, these signals are combined into one signal for input to a single ADC in the receiver. In one or more embodiments, the ADC generates samples of the combined signal while operating at a predetermined sampling frequency (e.g., Fclk or Fs), thereby leveraging on a single clock or PLL. Signal components corresponding to each of the plurality of signals are recovered from the generated samples, in one or more embodiments.

In one aspect, this disclosure is directed to a method of a multi-input receiver. In one or more embodiments, the method includes receiving, by a receiver, a plurality of signals each via a respective one of a plurality of wireless channels. In one or more embodiments, a processing stage of the receiver combines the received plurality of signals into a combined signal for input to an ADC of the receiver. In one or more embodiments, the ADC generates, at a predetermined sampling frequency, samples of the combined signal. In one or more embodiments, the receiver recovers, from the generated samples, at least one signal component corresponding to at least one of the plurality of signals.

In one or more embodiments, the combining of the received plurality of signals includes mixing each of at least some of the plurality of signals with a different fraction of the predetermined sampling frequency. In one or more embodiments, the received plurality of signals have a same carrier frequency. In one or more embodiments, the combining of the received plurality of signals includes frequency shifting at least one signal from the received plurality of signals to avoid spectral overlap with others of the received plurality of signals. In one or more embodiments, the method includes filtering each of the plurality of signals and/or suppressing noise from the plurality of signals to avoid spectral overlap between the noises from the plurality of signals.

In one or more embodiments, the recovering of the at least one signal component includes extracting a first signal component corresponding to one or more frequencies. In one or more embodiments, the method includes demodulating a first signal component from the at least one signal components, e.g., using in-phase/quadrature demodulation. In one or more embodiments, the combining of the received plurality of signals includes sampling each of the received plurality of signals after at least one of filtering or gain adjustment, and interleaving samples from the received plurality of signals. In one or more embodiments, the sampling of each of the received plurality of signals includes sampling each of the received plurality of signals at a frequency obtained by dividing the predetermined sampling frequency by a total number of the plurality of signals.

In another aspect, the disclosure is directed to a system for a multi-input receiver. In one or more embodiments, the system includes a plurality of antennas configured to wirelessly receive a plurality of signals each via a respective one of a plurality of wireless channels. A processing stage is configured to combine the plurality of signals into a combined signal, in one or more embodiments. An ADC is configured to generate, at a predetermined sampling frequency, samples of the combined signal, in one or more embodiments. In one or more embodiments, the at least one signal component corresponding to at least one of the plurality of signals is recoverable from the generated samples.

In one or more embodiments, the system includes one or more mixers for mixing each of at least some of the plurality of signals with a different fraction of the predetermined sampling frequency. In one or more embodiments, the received plurality of signals have a same carrier frequency. In one or more embodiments, the processing stage is configured to frequency shift at least one signal from the received plurality of signals to avoid spectral overlap with others of the received plurality of signals. In one or more embodiments, the processing stage is configured to filter each of the plurality of signals or suppress noise from the plurality of signals to avoid spectral overlap between the noises from the plurality of signals. In one or more embodiments, the system includes a tuner configured to recover the at least one signal component by extracting a first signal component corresponding to one or more frequencies. In one or more embodiments, the system includes a demodulator configured to demodulate a first signal component from the at least one signal components.

In yet another aspect, the disclosure is directed to method of a multi-input receiver. In one or more embodiments, the method includes receiving, by a receiver, a plurality of signals each via a respective one of a plurality of wireless channels. A processing stage of the receiver generates, at a first sampling frequency, samples of each of the received plurality of signals after at least one of filtering or gain adjustment, in one or more embodiments. The processing stage combines or interleaves the generated samples in time. An ADC of the receiver generates, at a second sampling frequency, samples from the interleaved samples. A extraction stage of the receiver recovers, from the samples generated at the second sampling frequency, signal components corresponding to at least one of the plurality of signals.

In one or more embodiments, the processing stage filters a first signal of the plurality of signals to suppress noise outside a bandwidth or spectrum of the first signal. In one or more embodiments, the processing stage adjusts gain of a first signal of the plurality of signals relative to at least one of: signal strength of a second signal of the plurality of signals or signal strength of noise of (or accompanying) a second signal. In one or more embodiments, the first sampling frequency is obtained by dividing the second sampling frequency by a total number of the plurality of signals or channels. In one or more embodiments, the processing stage generates a sample of each of the received plurality of signals at a different time. In one or more embodiments, the recovering of the signal components corresponding to at least one of the plurality of signals (or channels) includes de-multiplexing the samples generated at the second sampling frequency.

In comparison, some embodiments of a multi-channel receiver, such as a multi-input and multiple output (MIMO) receiver or a multi-band receiver, that includes multiple narrow-band receivers, are characterized by high area, cost and/or power. In one or more embodiments and by way of illustration, a multi-band receiver is implemented to receive signals for multi-band WLAN, although support for signals using other communications protocols, such as LTE, bluetooth (BT), satellite navigation (SatNav), etc., are contemplated. In one or more embodiments, each band or channel is processed by a full receive/transmit chain. In one or more embodiments, each receive chain has its own separate PLL. In the case of a MIMO receiver, each band or channel is processed by a full receive/transmit chain, and it is possible to apply one PLL to the receive/transmit chains.

In one or more embodiments, full-band capture receivers operating on just one narrow-band signal have one or more advantages of wideband receivers but have limited power efficiency. A reason for this is the limited spectral usage, in one or more embodiments. In one or more embodiments, full-band capture multi-channel receivers are characterized by excessively high dynamic range due to signal strength differences between frequency bands and blockers, and/or sensitivity to images with interleaved ADCs. In one or more embodiments, a full-band capture direct sampling receiver uses a ADC sample rate that is greater than twice the maximum signal frequency, and/or includes a dynamic range covering the maximum power difference between frequency bands and blockers. This leads to higher power, and in some cases make it prohibitive or even difficult to implement, in one or more embodiments. For example, and in one or more embodiments, this leads to high digital processing power, and in the case of a sampling frequency significantly higher than the combined signal bandwidth of the plurality of signals, the receiver becomes highly inefficient. In one or more embodiments, such a receiver is sensitive to images when interleaved ADCs are used.

In one or more embodiments of the present systems and methods, a receiver receives multiple channels (e.g., MIMO and/or multi-band) using one single ADC, based on direct-RF sampling techniques. In one or more embodiments, the ADC or receiver is a wideband capture ADC or receiver. In one or more embodiments, the ADC sampling rate is slightly greater than the combined bandwidth of the plurality of signals. In one or more embodiments, the receiver pushes or processes signals from multiple antennas, sources and/or bands simultaneously through one ADC. In one or more embodiments, this improves power efficiency and/or decreases the chip area significantly. In one or more embodiments, such a configuration leads to an ADC with relaxed dynamic range requirement and/or reduced sampling rate. Various embodiments of the present methods and embodiments could differ in the way how multiple channels are pushed through one ADC. Assuming that the ADC clock speed is Fclk for example, one or more embodiments of a receiver has N inputs being mixed first and then sampled by Fclk, in one aspect. Mixer frequencies are different for each input and, for instance, is set ay a*Fclk, where a=[0, ½, ¼, ⅛, etc.], in one or more embodiments. In another aspect, one or more embodiments of a receiver has N inputs sampled by Fclk/N by N different sampler circuits, followed by interleaving, and processing by one ADC that operates at Fclk. In yet another aspect, one or more embodiments of a receiver has input signals from different frequency bands being combined such that the Noise Figures of the signals are not degraded, followed by sampling at Fclk.

Figure 2A:
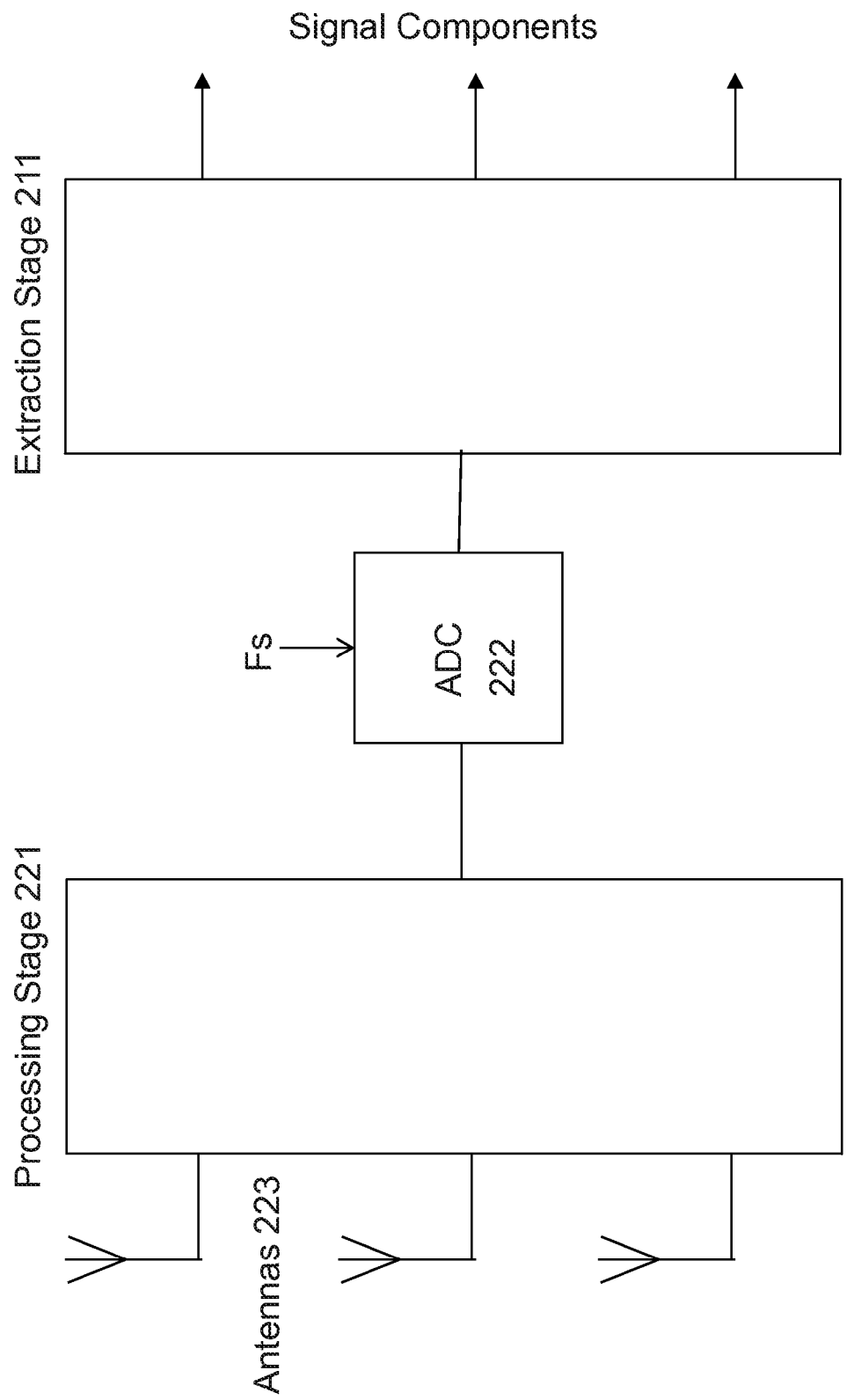
FIG. 2A is a diagram depicting one embodiment of a system of a multi-input receiver.

Referring to FIG. 2A, one example embodiment of a system of a multi-input receiver is depicted. In brief overview, the system includes a receiver, which includes a plurality of antennas 223, a processing stage 221, an ADC 222 and/or an extraction stage 211, in one or more embodiments. In one or more embodiments, the processing stage 221 includes one or more receive chains that communicates an output to the same ADC 222. By way of illustration, and in one or more embodiments, a receive chain includes some combination of one or more antennas, an amplifier, e.g., a low noise amplifier (LNA), a mixer, one or more filters and/or a sampler. In one or more embodiments, one or more receive chains operate concurrently to process signals incoming to the receiver. Each antenna may include an antenna array and/or one or more antenna elements.

At certain time instances for example, a WLAN receive chain and a BT receive chain operate simultaneously in one or more embodiments. At certain time instances for example, a receive chain for receiving signals at around 2 gigahertz and a receive chain for receiving signals at around 5 gigahertz, operate simultaneously in one or more embodiments. Each of the above-mentioned elements, components or stages is implemented in hardware, or a combination of hardware and software, in one or more embodiments. For instance, each of these elements or modules could include any application, program, library, script, task, service, process or any type and form of executable instructions executing on hardware of the device 102, in one or more embodiments. The hardware includes one or more of circuitry or a processor, for example, as described above in connection with at least 1B and 1C, in one or more embodiments.

Figure 2B:
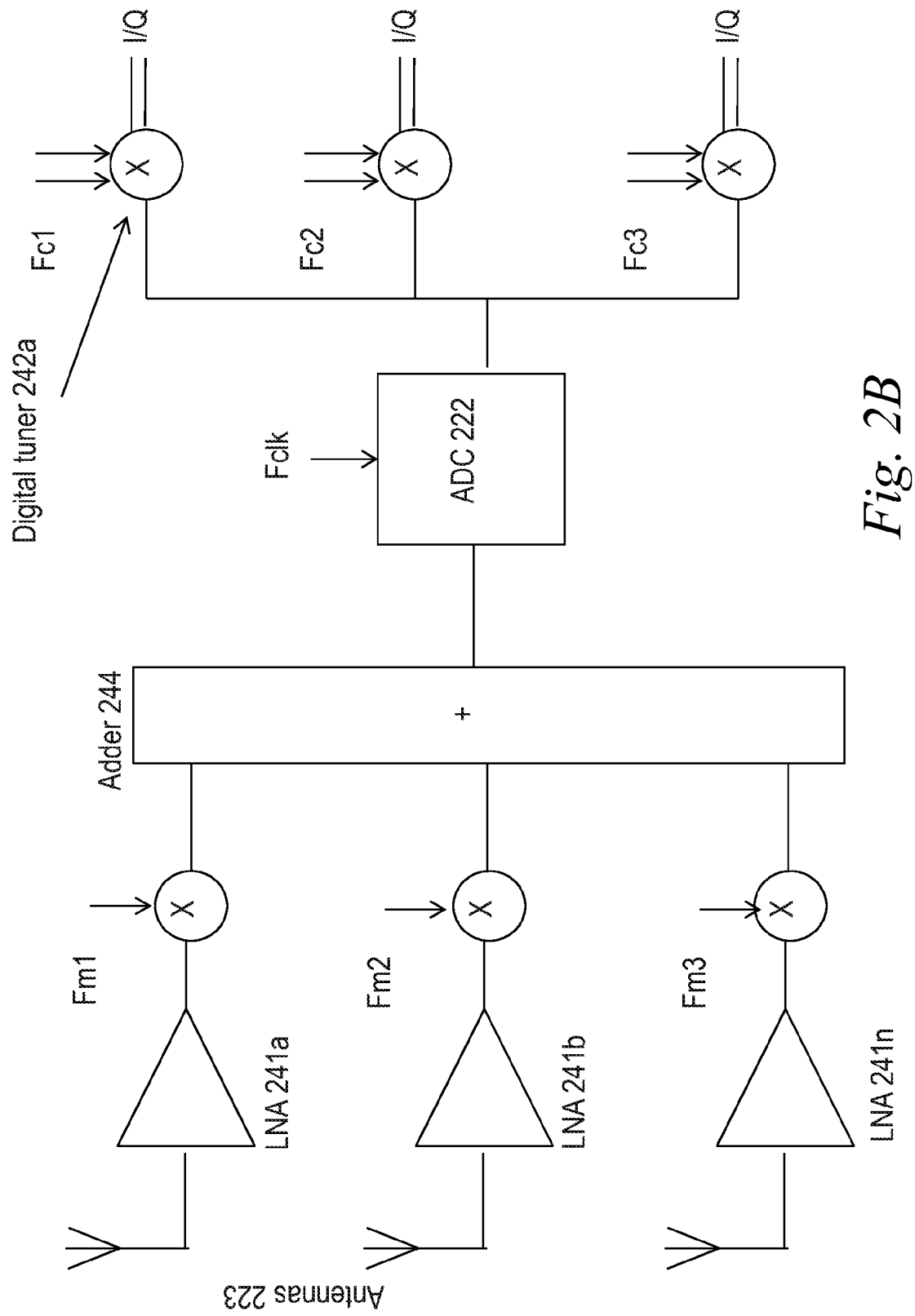
FIG. 2B is a diagram depicting another embodiment of a system of a multi-input receiver.

Referring to FIG. 2B, one example embodiment of a system of a multi-input receiver is depicted. In brief overview, the receiver receives a plurality of signals via multiple channels, and includes one ADC 222 in one or more embodiments. In one or more embodiments, the receiver includes a processing stage that includes a plurality of receive chains corresponding to the number of signal channels, and an extraction stage that includes a plurality of digital tuners. In one or more embodiments, the receiver includes an adder 244, sometimes referred to as a combiner, to combine signals processed by the received chains. In one or more embodiments, the processing stage corresponds to the processing stage 221 described above in connection with FIG. 2A. In one or more embodiments, the extraction stage corresponds to the extraction stage 211 described above in connection with FIG. 2A. In one or more embodiments, the receiver is implemented to support a plurality of channels of signals of the same or similar frequency bands, e.g., MIMO links. In one or more embodiments, one high-speed ADC 222 supports the signals from the plurality of channels.

In one or more embodiments, each receive chain includes a mixer or frequency-shifting circuitry to introduce a frequency shift (Fmi, e.g., Fm1, Fm2) such that the shifted frequencies across the channels or receive chains do not overlap. In one or more embodiments, the frequency shift, Fmi, is not identical to the carrier frequency. In one or more embodiments, the mixer or frequency-shifting circuitry down-converts and/or up-converts one or more of the signals. In one or more embodiments, mixer frequencies are selected such that these frequencies are easily derived from Fclk. By way of non-limiting example, Fmi=a*Fclk, a=0, ½, ¼, ⅛, etc., in one or more embodiments. In one or more embodiments, mixer frequencies is selected in any way so that the shifted frequencies (and any non-shifted frequencies) do not overlap. In one or more embodiments, the mixers (e.g., analog mixers) have no impact on the I/Q matching of the signal.

In one or more embodiments, the signals are down-converted (e.g., with Fmi=a*Fclk, a=0, ½, ¼, ⅛, etc.), so that the ADC sampling frequency, Fclk, is significantly higher than the down-converted frequencies. In one or more embodiments, one or more of the signal channels are filtered within the processing stage to suppress out-of-band noise (e.g., noise with frequency components beyond the bandwidth of the corresponding signal). In one or more embodiments, out-of-band noise from one channel/source potentially degrades or interferes with signals from other channels/sources when combined through the adder 244. In one or more embodiments, the adder 244 and/or the processing stage includes one or more filters to suppress and/or remove out-of-band noise. In one or more embodiments, the adder 244 includes a frequency-selective combiner that suppresses and/or removes out-of-band noise, e.g., from each channel. In one or more embodiments, the adder 244 is sometimes referred to as a diplexer (e.g., with two input channels), triplexer (e.g., with three input channels), a tetra-plexer (e.g., with four input channels), or a multiplexer.

Figure 2C:
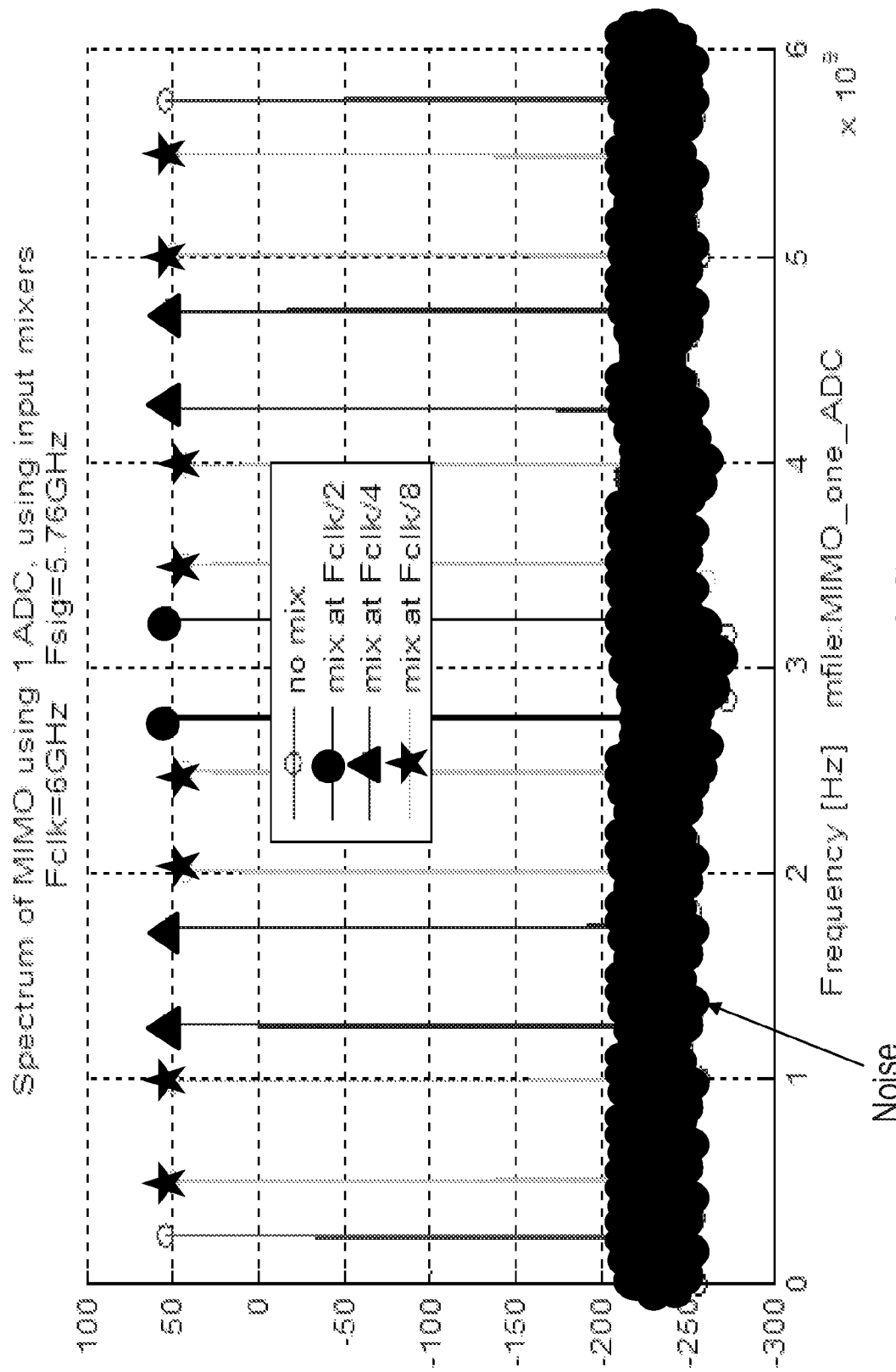
FIG. 2C depicts an example output spectrum from an analog to digital converter (ADC) of one embodiment of a multi-input receiver.

Referring now to FIG. 2C, an example spectrum of MIMO signals with frequency mixing is depicted. In one or more embodiments, the spectrum corresponds to MIMO signals processed in an embodiment of the system described above in connection with FIG. 2B. In one or more embodiments, one or more channels of MIMO signals are each processed by a mixer, e.g., in a processing stage 221 of a receiver. By way of example, the signal frequencies before mixing are around 5.76 GHz, e.g., the signals in each MIMO link or channel has a carrier frequency of 5.76 GHz, in one or more embodiments. In one or more embodiments, the sampling frequency of the ADC 222, Fclk, is 6 Giga-samples per second (GS/s), for example. In one or more embodiments, the mixer frequencies are at 0, Fclk/2, Fclk/4 and Fclk/8 for example. The spectrum indicates that there is no overlap of signals between channels (e.g., after mixing) at the ADC output, in one or more embodiments (e.g., other than noise). As such, digital tuners are able to extract or isolate signal components corresponding to each channel, and demodulate each channel separately, in one or more embodiments.

Figure 2D:
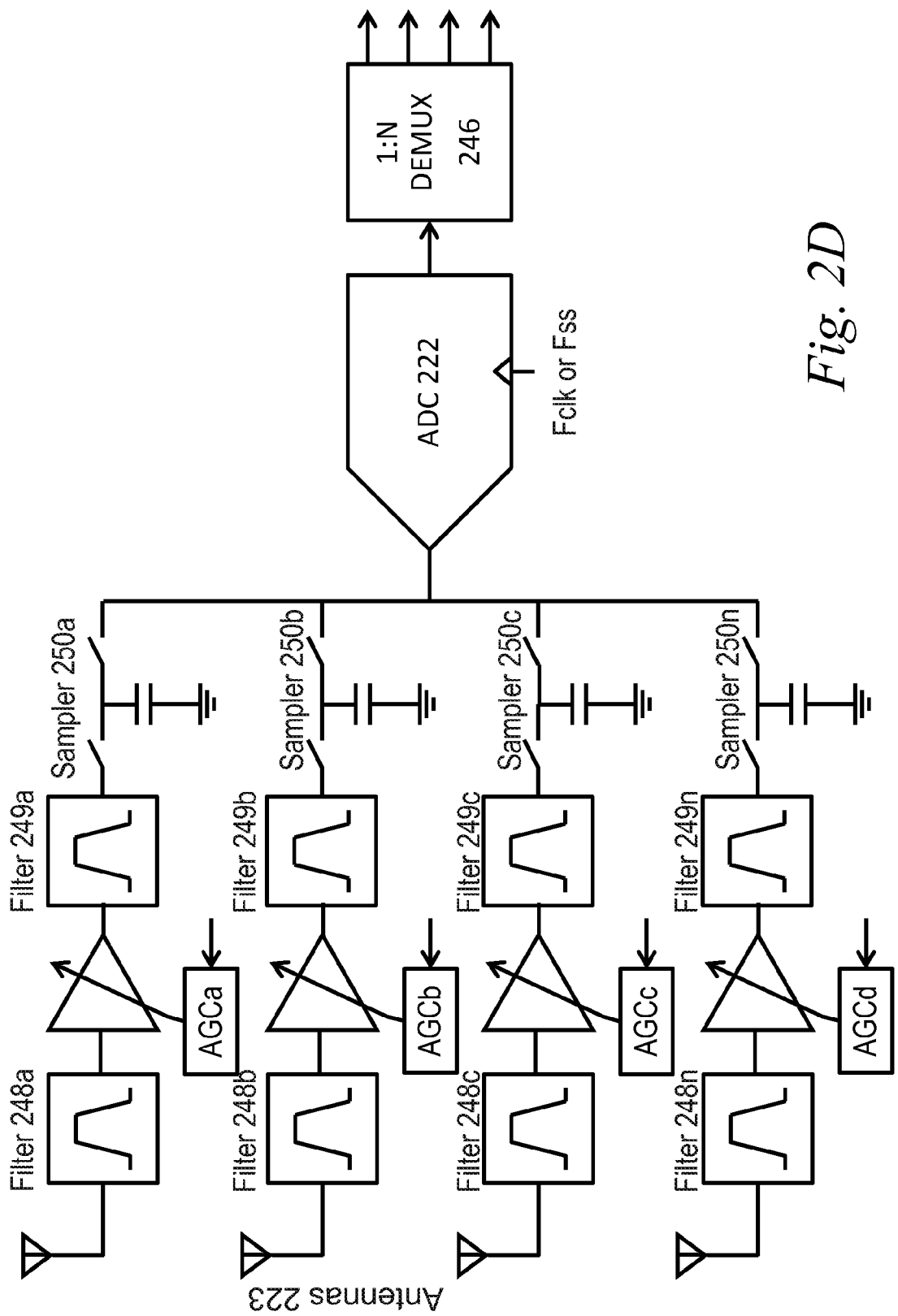
FIG. 2D is a diagram depicting an embodiment of a system of a multi-input receiver.

Referring now to FIG. 2D, an example embodiment of a system of a multi-input receiver is depicted. In brief overview, the receiver receives a plurality of signals via multiple channels, and includes one ADC 222 in one or more embodiments. In one or more embodiments, the receiver includes a processing stage that includes a plurality of receive chains corresponding to the number of signal channels, and an extraction stage that includes a demultiplexer 246. In one or more embodiments, the processing stage corresponds to the processing stage 221 described above in connection with FIG. 2A. In one or more embodiments, the processing stage includes a time-domain combiner, e.g., to interleave samples from different channels. In one or more embodiments, the extraction stage corresponds to the extraction stage 211 described above in connection with FIG. 2A. In one or more embodiments, the receiver is implemented to support a plurality of channels of signals of the same or different frequency bands, e.g., MIMO and/or multi-band signals. In one or more embodiments, one high-speed ADC 222 supports the signals from the plurality of channels after processing by the processing stage.

By way of illustration, and in one or more embodiments, a receive chain includes some combination of one or more antennas, an automatic gain control (AGC) feedback loop or other amplifier, one or more filters and/or a sampler 250 (or sampling circuit). The sampling frequency of the ADC 222 is represented by Fs. In one or more embodiments, signals from N different sources are sampled by N samplers 250 at a sampling rate of Fs/N and digitized by the ADC 222 at a sampling rate of Fs to produce N output data streams. In one or more embodiments, the N signals are filtered and/or amplified independently prior to the sampling by the N samplers 250. For example, and in one or more embodiments, signals from one channel is filtered (e.g., to remove noise), gain-adjusted, and/or filtered after gain-adjustment, in one or more embodiments.

In one or more embodiments, the gains of the N signal paths are controlled by N independent AGC loops (or circuits or modules) using the N output data streams. For example and in one or more embodiments, a feedback signal based on one or more of the N output data streams is fedback to an AGC module or circuit for the corresponding channel, which controls the gain adjustment for the channel signal. In one or more embodiments, the gain adjustment operates to control the strength (e.g., average strength or amplitude) of the corresponding signal relative to a threshold and/or one or more other signals from other channels. In one or more embodiments, the gain adjustment operates to control the strength (e.g., average strength or amplitude) of the corresponding signal towards a certain target value or range, e.g., determined based on one or more signals measured from the ADC output and/or demultiplexer output. In one or more embodiments, the gain adjustment operates to control the strength of the corresponding signal relative to detected noise, e.g., from the ADC 222 output and/or demultiplexer output.

In one or more embodiments, the N signals could come from N antennas at the same frequency (as in a MIMO receiver for example), or N frequency bands (as in a multi-band receiver for example), or a combination. In one or more embodiments, the ADC sample rate Fs is lower than 2×Fin(max), or twice the largest of the received signals' frequencies (or carrier frequencies). In one or more embodiments, the ADC sample rate Fs is equal to or lower than Fin(max). In one or more embodiments, the sample rate for each signal path, Fs/N, is set to be greater than the signal bandwidth of the corresponding channel. In one or more embodiments, more than one of the N samplers is used to sample a signal with bandwidth greater than Fs/N.

Figure 2E:
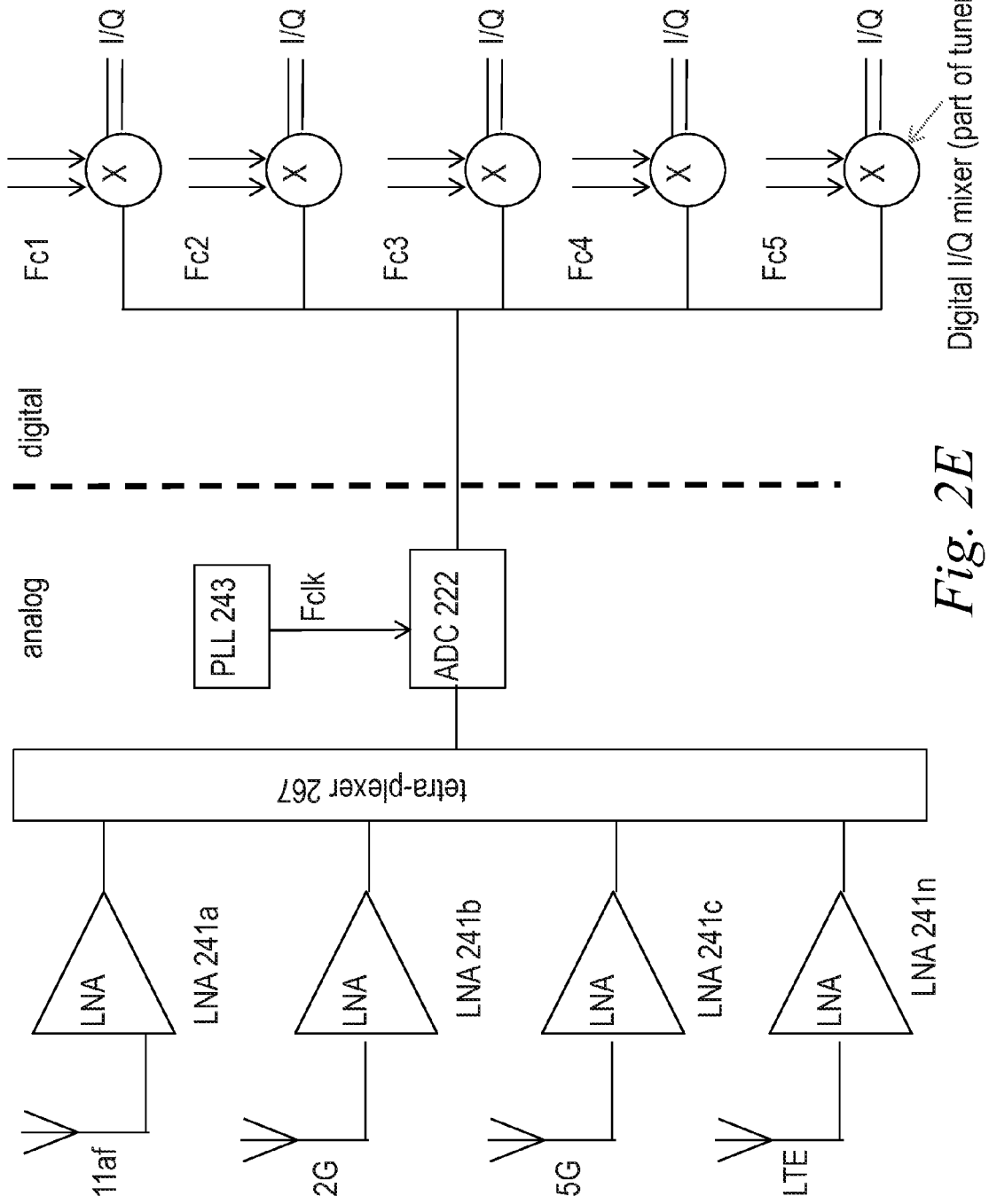
FIG. 2E is a diagram depicting another embodiment of a system of a multi-input receiver.

Referring to FIG. 2E, another example embodiment of a system of a multi-input receiver is depicted. In brief overview, the receiver receives a plurality of signals via multiple channels, and includes one ADC 222 in one or more embodiments. In one or more embodiments, the receiver includes a processing stage that includes a plurality of receive chains corresponding to the number of signal channels, and an extraction stage that includes a plurality of digital tuners. In one or more embodiments, the processing stage includes a combiner 267, sometimes referred to as a multiplexer (e.g., tetra-plexer, for four signal channels), to combine signals received and/or processed (e.g., amplified) by the received chains. In one or more embodiments, the processing stage corresponds to the processing stage 221 described above in connection with FIG. 2A. In one or more embodiments, the extraction stage corresponds to the extraction stage 211 described above in connection with FIG. 2A. In one or more embodiments, the receiver is implemented to support a plurality of channels of signals of different frequency bands. In one or more embodiments, one high-speed ADC 222 supports the signals from the plurality of channels, e.g., simultaneously. In one or more embodiments, one PLL is employed (e.g., with the ADC 222) to process or handle the signals from the plurality of channels.

In one or more embodiments, each receive chain includes one or more antennas, an amplifier such as an LNA 241 and/or one or more filters. In one or more embodiments, one or more of the signal channels are filtered within the processing stage to suppress out-of-band noise (e.g., noise with frequency components beyond the bandwidth of the corresponding signal). In one or more embodiments, out-of-band noise from one channel/source can degrade or interfere with signals from other channels/sources when combined through the combiner 267. In one or more embodiments, the combiner 267 or the processing stage includes one or more filters to suppress and/or remove out-of-band noise. In one or more embodiments, the combiner 267 includes a frequency-selective or frequency domain combiner that suppresses and/or removes out-of-band noise, e.g., from each channel or signal spectrum. In one or more embodiments, the combiner 267 includes a frequency-selective combiner that combines the processed or amplified signals without affecting or degrading the noise figure or signal-to-noise ratio of each channel. In one or more embodiments, the combiner 267 prevents noise from being additive across two or more channels. In one or more embodiments, the combiner 267 is sometimes referred to as a diplexer (e.g., with two input channels), triplexer (e.g., with three input channels), a tetra-plexer (e.g., with four input channels), or more generally a multiplexer.

In one or more embodiments, the extraction stage includes a plurality of tuners or digital tuners 242. In one or more embodiments, the extraction stage extracts or separates out signal components corresponding to the channels, from the output of the ADC 222. Each tuner 242 includes a digital I/Q mixer to perform I/Q matching of the ADC output to extract the corresponding signal component, e.g., I/Q signals of the corresponding channel. In one or more embodiments, digital mixers are used for the down-mixing to zero or bandband frequency, and/or have perfect I/Q matching.

In one or more embodiments, the present systems and methods employ a simplified fixed-frequency clock system using one PLL in a multi-channel receiver. In one or more embodiments, the receiver achieves or sees strongly reduced voltage controlled oscillator (VCO) pulling issues since VCO frequency is no longer an integer times of the transmit frequency. The receiver achieves high PLL bandwidth (e.g., less VCO phase noise) since no analog frequency tuning is required, in one or more embodiments. In one or more embodiments, the present systems and methods provide strong increased visibility at RF signals (e.g., analog RF signals are available in digital domain). There is reduced impact of blockers (e.g., by correlating a blocker to a received signal), in one or more embodiments. In one or more embodiments, the present systems and methods enables RF distortion correction for reception and transmission, and allows monitoring of an adjacent channel. In one or more embodiments, the present systems and methods reduce out-of-band noise in co-existence mode if a transmitter and a receiver share a same clock.

Figure 2F:
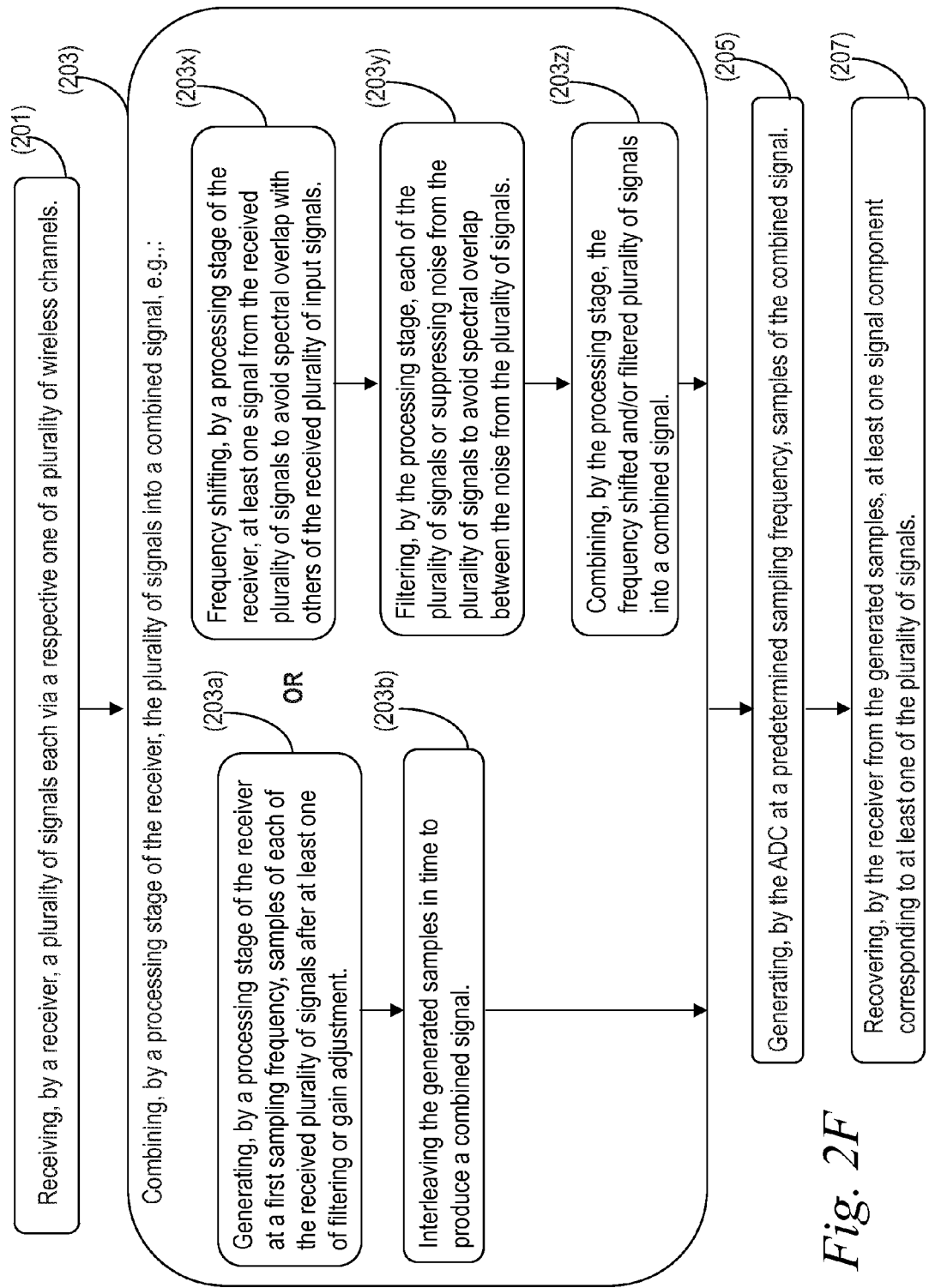
FIG. 2F is a flow diagram of an embodiment of a method of a multi-input receiver.

Referring now to FIG. 2F, one embodiment of a method for a multi-input receiver is depicted. The method includes receiving, by a receiver, a plurality of signals each via a respective one of a plurality of wireless channels, in one or more embodiments (operation 201). A processing stage of the receiver combines the received plurality of signals into a combined signal for input to an ADC of the receiver in one or more embodiments (operation 203). The ADC generates, at a predetermined sampling frequency, samples of the combined signal, in one or more embodiments (operation 205). The receiver recovers, from the generated samples, at least one signal component corresponding to at least one of the plurality of signals (operation 207).

Referring now to operation 201, and in some embodiments, a receiver receives a plurality of signals each via a respective one of a plurality of wireless channels. In one or more embodiments, the receiver receives a plurality of signals each via a respective one of a plurality of antennas of the receiver. The receiver receives and/or processes a first signal via a first receive chain of the receiver, in one or more embodiments. The receiver receives a plurality of signals with frequencies corresponding to one or more frequency bands or channels, in one or more embodiments. The receiver, e.g., a MIMO receiver, receives a plurality of signals with frequencies within a same frequency band, in one or more embodiments. The receiver receives a plurality of signals each of a different band and/or from a different source, in one or more embodiments. In one or more embodiments, a receive chain of the receiver receives signals for a corresponding channel, as well as noise (e.g., out-of-band noise and/or in-band noise). In one or more embodiments, the receiver receives and/or processes some or all of the plurality of signals simultaneously.

Referring now to operation 203, and in some embodiments, a processing stage 221 of the receiver combines the received plurality of signals into a combined signal for input to an ADC 222 (e.g., one single high-speed ADC 222) of the receiver. In one or more embodiments, a receiver combines inputs from different frequency bands such that Noise Figures of the corresponding channels/bands are not degraded. In one or more embodiments, these signals are combined into one signal for input to a single ADC in the receiver. In one or more embodiments, the operation or stage of combining the received plurality of signals includes mixing each of at least some of the plurality of signals with a different fraction of the predetermined sampling frequency. In one or more embodiments, the received plurality of signals have a same carrier frequency. In one or more embodiments, the operation or stage of combining the received plurality of signals includes frequency shifting at least one signal from the received plurality of signals, e.g., to avoid spectral overlap with others of the received plurality of signals (e.g., operation 203x). Assuming that the ADC clock speed is Fclk for example, one or more embodiments of a receiver has N inputs being mixed first and then sampled by Fclk, in one aspect. Mixer frequencies are different for each input and are, for instance, a*Fclk, where a=[0, ½, ¼, ⅛, etc.], in one or more embodiments. In one or more embodiments, mixer frequencies are selected in any way so that the shifted frequencies (and any non-shifted frequencies) do not overlap. For example and in one or more embodiments, a mixer is used to mix or frequency-shift a first signal of the received plurality of signals. In one or more embodiments, the processing stage filters one or more of the plurality of signals and/or suppresses noise (e.g., out-of-band noise, and/or receive chain or amplifier noise) from one or more of the plurality of signals to avoid spectral overlap between the noises from the plurality of signals (e.g., operation 203y). In one or more embodiments, a filter (e.g., of each receive chain) filters a corresponding one of the plurality of signals and/or suppresses noise from a corresponding one of the plurality of signals or channels. In one or more embodiments, the receiver includes an adder 244 to combine signals processed by the received chains.

In one or more embodiments, the operation or stage of combining the received plurality of signals by the processing stage 211 includes sampling each of the received plurality of signals after at least one of filtering or gain adjustment, and interleaving samples from the received plurality of signals. For example, for a receiver with N signal inputs, each of the N signals are independently filtered, amplified, and sampled in one or more embodiments. In one or more embodiments, each of the N samplers samples a corresponding signal at Fclk/N, and the sampling is time/phase-shifted or time-interleaved between the N samplers. In one or more embodiments, sampling each of the received plurality of signals (e.g., by each corresponding sampler 250) includes sampling each of the received plurality of signals at a frequency (e.g., Fs/N or Fclk/N) obtained by dividing the predetermined sampling frequency (e.g., Fs or Fclk) by a total number of the plurality of signals (e.g., N).

In one or more embodiments, a first sampling frequency or rate (e.g., Fs/N or Fclk/N) of a sampler 250 is obtained by dividing the second sampling frequency (e.g., Fs or Fclk) by a total number of the plurality of signals (e.g., N). In one or more embodiments, the processing stage 221 of the receiver generates, at a first sampling frequency, samples of each of the received plurality of signals after at least one of filtering or gain adjustment (e.g., operation 203a). In one or more embodiments, generating samples of each of the received plurality of signals includes generating a sample of each of the received plurality of signals at a different point in time, and/or at a same sampling rate or frequency. In one or more embodiments, the processing stage includes a time-domain combiner, e.g., to interleave samples from different channels. In one or more embodiments, the processing stage 221 adds, combines and/or interleaves the generated samples in time (e.g., operation 203b). The samples are interleaved and then sampled by the ADC 222 before demultiplexing to recover N signal components, in one or more embodiments.

In one or more embodiments, one or more of the signal channels are filtered within the processing stage to suppress out-of-band and/or receive-chain-introduced noise. In one or more embodiments, a filter in a first receive chain of the processing stage 221 filters a first signal of the plurality of signals, e.g., to suppress noise outside a bandwidth or spectrum of the first signal. In one or more embodiments, an amplifier and/or AGC loop/circuit of a first receive chain of the processing stage 221 adjusts gain of a first signal of the plurality of signals, e.g., relative to at least one of: signal strength of a second signal of the plurality of signals or signal strength of noise of a second signal. In one or more embodiments, an output of the ADC 222 and/or extraction stage 211 is used to control the AGC loop/circuit's adjustment of the gain of the first signal. The sequence of operations described herein could be modified, and do not have to occur in the order mentioned herein. For example, operation 203y could occur before operation 203x in one or more embodiments. Moreover, some operations could be optional, e.g., one or more frequency-shifting, filtering and/or gain adjustment operations.

Referring now to operation 205, and in some embodiments, the ADC 222 generates, at a predetermined sampling frequency, samples of the combined signal. In one or more embodiments, the receiver pushes or processes signals from multiple antennas, sources and/or bands simultaneously through one ADC 222. In one or more embodiments, the ADC 222 generates samples of the combined signal while operating at a predetermined sampling frequency, thereby leveraging on a single clock or PLL. The ADC 222 digitizes the combined signals at the predetermined (or second) sampling frequency (e.g., Fclk) in one or more embodiments. In one or more embodiments, where the combined signal includes interleaved samples obtained at a first sampling frequency, the ADC 222 of the receiver generates, at a second sampling frequency, samples from the interleaved samples.

Referring now to operation 207, and in some embodiments, the receiver (e.g., extraction stage 211) recovers, from the generated samples, at least one signal component corresponding to at least one of the plurality of signals. In one or more embodiments, recovering the at least one signal component includes extracting a first signal component corresponding to one or more frequencies (e.g., of a frequency band or channel). In one or more embodiments, the extraction stage 211 recovers a plurality of signal components each corresponding to one of the plurality of signals or channels. In one or more embodiments, a digital tuner performs I/Q matching corresponding to a frequency of a first signal channel to extract, recover and/or demodulate a signal component from the output of the ADC 222.

In one or more embodiments, the recovering of the signal components corresponding to at least one of the plurality of signal includes de-multiplexing the samples generated by the ADC 222 at the second sampling frequency. In one or more embodiments, the receiver demodulates a first signal component from the at least one signal components. In one or more embodiments, each digital tuner 242 demodulates each channel separately.

It should be noted that certain passages of this disclosure can reference terms such as "first" and "second" in connection with devices, signals, channels, etc., for purposes of identifying or differentiating one from another or from others. These terms are not intended to merely relate entities (e.g., a first signal and a second signal) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method of a multi-input receiver, the method comprising:
    receiving, by a receiver, a plurality of signals each via a respective one of a plurality of wireless channels the received plurality of signals having a same carrier frequency;
    combining, by a processing stage of the receiver, the received plurality of signals into a combined signal for input to an analog-to-digital converter (ADC) of the receiver, wherein combining the received plurality of signals includes sampling each of the received plurality of signals after filtering and/or gain adjustment, and mixing with a different fraction of a predetermined sampling frequency, and interleaving samples from the received plurality of signals;
    generating, by the ADC at the predetermined sampling frequency, samples of the combined signal; and
    recovering, by the receiver from the generated samples, at least one signal component corresponding to at least one of the plurality of signals.

2. The method of claim 1, further comprising filtering each of the plurality of signals or suppressing noise from the plurality of signals to avoid spectral overlap between the noise from the plurality of signals.

3. The method of claim 1, wherein recovering the at least one signal component includes extracting a first signal component corresponding to one or more frequencies.

4. The method of claim 1, further comprising demodulating a first signal component from the at least one signal components.

5. The method of claim 1, further comprising adjusting gain of a first signal of the received plurality of signals relative to at least one of: signal strength of a second signal of the received plurality of signals or signal strength of noise of the second signal.

6. The method of claim 1, wherein sampling each of the received plurality of signals comprises sampling each of the received plurality of signals at a frequency obtained by dividing the predetermined sampling frequency by a total number of the plurality of signals.

7. A method of a multi-input receiver, the method comprising:
    receiving, by a receiver, a plurality of signals each via a respective one of a plurality of wireless channels;
    combining, by a processing stage of the receiver, the received plurality of signals into a combined signal for input to an analog-to-digital converter (ADC) of the receiver, wherein combining the received plurality of signals includes mixing each of at least some of the plurality of signals with a different fraction of a predetermined sampling frequency, the received plurality of signals having a same carrier frequency;
    generating, by the ADC at the predetermined sampling frequency, samples of the combined signal; and
    recovering, by the receiver from the generated samples, at least one signal component corresponding to at least one of the plurality of signals.

8. The method of claim 7, wherein combining the received plurality of signals includes frequency shifting at least one signal from the received plurality of signals to avoid spectral overlap with others of the received plurality of signals.

9. A system for a multi-input receiver, the system comprising:
    a plurality of antennas configured to wirelessly receive a plurality of signals each via a respective one of a plurality of wireless channels, the received plurality of signals having a same carrier frequency;
    one or more mixers for mixing each of at least some of the plurality of signals with a different fraction of a predetermined sampling frequency;
    a processing stage configured to combine the plurality of signals after the mixing into a combined signal; and
    an analog-to-digital converter (ADC) configured to generate, at the predetermined sampling frequency, samples of the combined signal, wherein at least one signal component corresponding to at least one of the plurality of signals is recoverable from the generated samples.

10. The system of claim 9, wherein the processing stage is further configured to adjust a gain of a first signal of the received plurality of signals relative to at least one of: signal strength of a second signal of the received plurality of signals or signal strength of noise of the second signal.

11. The system of claim 9, wherein the processing stage is configured to frequency shift at least one signal from the received plurality of signals to avoid spectral overlap with others of the received plurality of signals.

12. The system of claim 9, wherein the processing stage is configured to filter each of the plurality of signals or suppress noise from the plurality of signals to avoid spectral overlap between the noise from the plurality of signals.

13. The system of claim 9, further comprising a tuner configured to recover the at least one signal component by extracting a first signal component corresponding to one or more frequencies.

14. The system of claim 9, further a demodulator configured to demodulate a first signal component from the at least one signal components.

15. A method of a multi-input receiver, the method comprising:
- receiving, by a receiver, a plurality of signals each via a respective one of a plurality of wireless channels the received plurality of signals having a same carrier frequency;
- generating, by a processing stage of the receiver at a first sampling frequency, first samples of each of the received plurality of signals after of filtering and/or gain adjustment and mixing with a different fraction of a second sampling frequency;
- interleaving the generated first samples in time;
- generating, by an analog-to-digital converter (ADC) of the receiver at the second sampling frequency, second samples from the interleaved first samples; and
- recovering, from the second samples generated at the second sampling frequency, signal components corresponding to at least one of the plurality of signals.

16. The method of claim 15, comprising filtering a first signal of the plurality of signals to suppress noise outside a bandwidth of the first signal.

17. The method of claim 15, comprising adjusting gain of a first signal of the plurality of signals relative to at least one of: signal strength of a second signal of the plurality of signals or signal strength of noise of the second signal.

18. The method of claim 15, wherein the first sampling frequency is obtained by dividing the second sampling frequency by a total number of the plurality of signals.

19. The method of claim 15, wherein generating first samples of each of the received plurality of signals comprises generating a sample of each of the received plurality of signals at a different time.

20. The method of claim 15, wherein recovering the signal components corresponding to at least one of the plurality of signal comprises de-multiplexing the second samples generated at the second sampling frequency.

* * * * *